United States Patent [19]

Olabisi

[11] 4,247,515
[45] Jan. 27, 1981

[54] PROCESS FOR MOLDING OF PLASTIC STRUCTURAL WEB ARTICLES

[75] Inventor: Olagoke Olabisi, Plainfield, N.J.

[73] Assignee: Union Carbide Corporation, New York, N.Y.

[21] Appl. No.: 936,056

[22] Filed: Aug. 23, 1978

Related U.S. Application Data

[62] Division of Ser. No. 705,101, Jul. 14, 1976, Pat. No. 4,136,220.

[51] Int. Cl.³ .................... B29C 17/04; B29D 27/00
[52] U.S. Cl. .................... 264/500; 264/45.1; 264/46.6; 264/570; 264/164; 264/DIG. 83; 264/328.12; 264/328.13
[58] Field of Search .............. 264/DIG. 83, 51, 164, 264/328, 500, 570, 45.1, 46.6

[56] References Cited

U.S. PATENT DOCUMENTS

| 2,502,304 | 3/1950 | Baker | 264/164 |
|---|---|---|---|
| 3,268,636 | 8/1966 | Angell | 264/DIG. 83 |
| 3,436,446 | 4/1969 | Angell | 264/DIG. 83 |
| 3,865,667 | 2/1975 | Ferrari | 264/88 X |
| 3,919,446 | 11/1975 | Smarook | 264/164 X |
| 3,929,951 | 12/1975 | Shibata et al. | 264/94 X |
| 3,935,358 | 1/1976 | Wyeta et al. | 264/94 X |

FOREIGN PATENT DOCUMENTS 2461580  7/1975  Fed. Rep. of Germany ... 264/DIG. 83

OTHER PUBLICATIONS

ASTM Standard Test No. D-1238-73, pp. 427–437, "Standard Method of Measuring Flow Rates of Thermoplastics by Extrusion Plastometer".
Celanese Bulletin, GIC, 7th Edition, "Standard Tests on Plastics," Celanese Plastics Co., Div. of Celanese Corp., Newark, N.J., Apr., 1974., p. 13, Front and Rear Cover Pages.

*Primary Examiner*—Philip Anderson
*Attorney, Agent, or Firm*—Gerald R. O'Brien, Jr.

[57] ABSTRACT

Process is disclosed wherein plastic material is passed into a mold cavity; pressurizing fluid is injected into the plastic material under controlled pressure and at a controlled rate to cause the plastic material to flow out and assume the contour of the cavity, the gas pressure being maintained until the plastic material is self-supporting. The resulting article has an outer skin and a generally hollow center containing skin-connecting structural "webs".

4 Claims, 10 Drawing Figures

PROCESS FOR MOLDING OF PLASTIC STRUCTURAL WEB ARTICLES

This application is a division of my prior copending U.S. application Ser. No. 705,101, filed July 14, 1976 and issued as U.S. Pat. No. 4,136,220.

The present invention relates to a novel process for the molding of plastic structural web articles.

Heretofore, many attempts have been made to provide processes for the production of structural plastic articles employing less than a full density of plastic material, yet producing articles having structural properties which exceed even those of solid (full density) plastic material articles of the same weight.

The most notable of such prior processes are those provided for the production of structural foam. The Society of the Plastics Industry, on page 2 of its booklet "Structural Foam", defines such resultant structural foam article "as a plastic product having integral skins, cellular core and having a high enough strength-to-weight ratio to be classed as 'structural'".

Such structural foam process and the resulting article is typified by those of the teachings of U.S. Pat. Nos. 3,268,636 and 3,436,446 to Richard G. Angell, Jr.

The continuing objective of the plastic molding art is the provision of processes for the production of novel articles of higher flexural modulus than obtainable for an identical density structural foam article, such novel articles also having lower densities than solid articles of the same outer shape and composition.

In accordance with one aspect of the present invention, a process is provided for the production of a molded plastic structural web article comprising the steps of:

(a) passing plastic material into a mold cavity, (b) injecting low viscosity pressurizing fluid into the said mold cavity, (c) coordinating the fluid flow rate and pressure, the volume and flow length-to-part thickness ratio of the mold cavity, plastic viscosity, elasticity, density and volume, fluid viscosity and density, and fluid-plastic interfacial tension to cause the pressurizing fluid to penetrate into said plastic material and cause it to assume the contour of said mold cavity, thereby forming a molded structural web article without causing the low viscosity pressurizing fluid to break through the plastic material flow front and prevent the plastic material from substantially completely assuming the contour of said mold cavity, and (d) maintaining a positive pressure in the mold until said article is self-supporting.

The novel resulting structural web article of the invention comprises an integral body of plastic material having an outer skin and a generally continuous hollow center and positioned therein at least one skin-connecting web, a web positioned near an injection point being generally disposed in direction toward said injection point, and it is in this sense that the term "structural web" body or artical is employed herein.

As employed herein, "plastic material" is understood to mean any plastic material composition which exhibits plastic flow properties under the temperature and pressure conditions employable in the present invention, in connection with extrusion, mixing and molding. Thus, the term "plastic material" is understood to include all organic and inorganic materials having, with or without additives, thermoplastic characteristics and capable of being extruded, mixed and molded under such temperature and pressure conditions at which they exhibit relatively high viscosity characteristics. Certain synthetic organic resins, such as polyethylene and polyvinyl chloride, even when possessing high filler addition, are widely recognized as possessing thermoplastic characteristics. Other resins, such as phenolic resins, are widely accepted as thermosetting resins. It is, however, to be noted that such resins do exhibit thermoplastic characteristics until they are reacted at a temperature and for a time sufficient to produce the cross-linking necessary to cause them to be considered as substantially thermoset. Therefore, it is to be understood that such uncross-linked thermosettable materials are to be regarded as "plastic material" within the scope of the present invention.

"High viscosity" is understood to mean a viscosity greater than about 1000 centipoises.

As employed herein, the term "low viscosity pressurizing fluid" is understood to mean normally gaseous as well as liquid pressurizing fluids. Examples of such gaseous fluids are argon, nitrogen, carbon dioxide, air, methyl chloride, propylene, butylene and gaseous fluorocarbons. Examples of such liquid fluids are pentane, water and liquid fluorocarbons. It is to be understood that such "low viscosity pressurizing fluid" is either not reactive with the plastic material under the pressure and temperature conditions employed in the process of the invention or if reactive the reaction does not occur with such speed as to completely prevent fluidity.

"Low viscosity" is understood to mean a viscosity up to about several centipoises, it being understood that the ratio of viscosity of the high viscosity plastic material to that of the low viscosity pressurizing fluid is higher than 10:1.

As employed herein the terms "generally continuous hollow center" and "hollow center" refer to that portion of a structural web article which is so effected by at least one injection point and having at least one skin-connecting web.

It has been found, in the practice of the process of the invention, that the following process variables are determinative of the attainment of the desirable novel structural web product:

(a) Mold cavity volume;
(b) Flow length-to-part thickness ratio;
(c) Plastic material volume;
(d) Plastic material density;
(e) Plastic material viscosity;
(f) Plastic material elasticity;
(g) Pressurizing fluid flow rate;
(h) Pressurizing fluid pressure;
(i) Pressurizing fluid density;
(j) Pressurizing fluid viscosity; and
(k) Pressurizing fluid-plastic material interfacial tension.

The values of these variable process parameters must be coordinated, in accordance with the invention, to cause the pressurizing fluid to penetrate into said plastic material and cause it to assume the contour of said mold cavity, thereby forming a molded structural web article without causing the low viscosity pressurizing fluid to break through the plastic flow front and prevent the plastic from substantially completely assuming the contour of said mold cavity. The term "substantially completely assume the contour of said mold cavity" is employed to indicate that a relatively small outlet passage may desirably be provided into a mold cavity by the provision of at least one small outlet in the walls of the mold cavity at desired points.

It is further understood that the volume of the selected mold cavity need not be fixed at that value enclosed within the mold halves. For example, an initially fixed pair of mold halves may be expanded by the pressurizing fluid to a volume exceeding the initially enclosed volume. Alternatively, moveable mold walls may be provided for increasing the mold volume from that initially employed at the beginning of the plastic material injection and pressurizing operation.

In the practice of the process aspect of the invention, a quantity of plastic material is fed into the mold cavity which is preferably maintained at ambient temperature.

The mold cavity volume and configuration is determined by the shape and size of the structural web article to be produced by the process of the invention. The flow length-to-part thickness ratio of the mold cavity is determined by the shape (geometry) of the mold cavity.

The plastic material volume is metered to fill the interior of the mold cavity upon later full expansion of such plastic material by the pressurizing fluid to assume the contour of the walls of the mold cavity and produce the desired structural web article. For given operating conditions of temperature and pressure, the plastic material density, viscosity and elasticity are determined by the selection of plastic material employed in accordance with strength and other desired physical and/or chemical characteristics of the resulting structural web product desired. The plastic material density, viscosity and elasticity are, however, parameters to be seriously considered in the practice of the process of the invention although they are predetermined upon the selection of the plastic material.

The pressurizing fluid flow rate is a very significant parameter in the process of the present invention as is the pressurizing fluid pressure, both of which will be discussed in detail hereinbelow in connection with the obtainment of suitable structural web articles. For given operating conditions of temperature and pressure and pressurizing fluid density and viscosity are predetermined upon selection of a desirable pressurizing fluid as in the case of the plastic material selection being determinative of its density, viscosity and elasticity. However, far more latitude is permissible in the selection of pressurizing fluid.

The selection of a specific pressurizing fluid and a plastic material for the practice of the process of the invention are quite important in determining a critical variable in the practice of the process, i.e., the fluid-plastic interfacial tension. It is to be understood that an interfacial tension will exist between two fluid phase systems as long as the systems are different (chemically and/or physically).

Accordingly, after passing a body of plastic material into the mold cavity, the relatively low viscosity pressurizing fluid is injected through at least one point into the plastic material so that the fluid-plastic interface is deformed into a wavelike corrugation of finite wave-length by proper coordination of pressure, flow rate and geometric characteristics of the mold. Then, as the process variables discussed above are coordinated, the pressurizing fluid causes the plastic material front to flow to assume the contour of the walls of the mold cavity. This takes place with a proliferation of distortions at the fluid-plastic interface, each distortion producing an elongated "web" or web-shaped protrusion along the direction of plastic material flow. The pressurizing fluid pressure, as a variable, takes advantage of the resistance to flow of the plastic material. Consequently, higher pressurizing fluid pressure results in greater interface distortions of plastic material and consequently the production of more plastic web-shaped protrusions or "webs".

The flow of plastic material in generating the webs and finally reaching the walls of the mold cavity produces a hollow plastic material article having an outer skin and a generally continuous hollow center and positioned therein at least one skin-connecting web, a web positioned near an injection point being generally disposed in direction towards said injection point, while those positioned away from an injection point are generally disposed in the direction of the pressurizing fluid flow.

The following discussion represents an attempt to explain theoretically the phenomenon obtained in the practice of the invention, it being understood, however, that such invention, as disclosed and claimed herein, is not to be limited by such theoretical analysis.

After the injection of plastic material into a mold cavity during the formation of the structural web article, pressurizing fluid is injected into the plastic material through at least one injection point. The pressure of the pressurizing fluid initiates the movement of plastic material away from the injection point such that the plastic flow front moves toward the periphery of the mold, whereas there is a proliferation of webs formed at the rear fluid-plastic interface. These webs will grow in length with time, if the growth rate R is positive, in accordance with the equation: web length$=c\ e^{(R \cdot t)}$, wherein R is as set forth in the expression below. If the growth rate reduces to zero, the length of the webs will remain static (constant) and if the growth rate is negative the rear of the web will merge with the web front and the web will eventually disappear.

Accordingly, the attainment of the desired "webbing" phenomenon which ultimately produces the formation of the desired webs in the resultant molded article requires a positive growth rate R in the expression:

$$R = \left[ \frac{\mu_p - \mu_f}{\mu_p + \mu_f} \cdot v + \frac{d_p - d_f}{12(\mu_p + \mu_f)} \cdot g \cdot b^2 \right] v - \frac{\gamma b^2}{12(\mu_p + \mu_f)} \cdot \quad (1)$$

$$v^3 \pm \dot{\Gamma} f\left( \frac{\tau v}{b}, \frac{\tau v}{L}, \frac{\tau p}{\mu \lambda v}, \frac{\tau \Delta v}{h} \right).$$

R = growth rate of a given web
$\mu_p$ = plastic material viscosity
$\mu_f$ = fluid viscosity
v = fluid-plastic interface velocity
$d_p$ = plastic material density
$d_f$ = fluid density
b = characteristic part thickness
g = acceleration due to gravity
$\nu$ = wave-number $= 2\pi/l$
l = characteristic wave length
L = characteristic part length
p = fluid pressure
$\lambda$ = distance between two plastic webs
$\Delta v$ = velocity difference between two different points on the same side of a plastic web
h = distance between the same two different points
$\dot{\Gamma}$ = characteristic interface shear rate $\sim v/b$
$\gamma$ = interfacial tension τ = relaxation time of the plastic material.

Note that viscosity $\mu$ is a function of shear rate and one model that has been proved to be generally successful is the power-law model, namely $$\mu = \mu_o |\dot{\Gamma}|^{n-1} \qquad (2)$$

where $\mu_o$ = Zero shear viscosity
n = 1 Newtonian material
n > 1 Dilatant plastic material
n < 1 Pseudo-plastic material The last term in equation (1) denotes an appropriate viscoelastic functional contribution to the growth rate of a characteristic plastic web. In this representation we choose to consider the viscoelastic contribution in terms of dimensional analysis comprising the four dimensionless numbers in bracket. The first is the Deborah number, the second is the Weissenberg number and the remaining two are hitherto unknown but they represent variations of the first two which arise from consideration of the mechanism of plastic webbing and are considered to be important in this process. Furthermore, the functionality of R upon these numbers will vary from one plastic material to the other, but the total as well as the individual effects are not known quantitatively. From qualitative considerations it can be visualized that the viscoelastic contribution can be either positive or negative. In addition, it is not known a priori, whether the viscoelastic component should dominate or not. Accordingly, it can not be predicated whether a given plastic material would exhibit the webbing behavior.

Since our conditions have been chosen so that operations are not at an extremely high shear rate wherein a viscoelastic material may behave as a solid with consequent "shattering", we assume an arbitrary constant value for the viscoelastic contribution in order to be able to study the effects of viscosity, velocity, interfacial tension, part thickness and material density, as they appear in the first three quantities of equation (1).

For certain conditions, growth rate R as a function of wave number is always negative, thereby implying that webs cannot be formed under those conditions. Under other conditions, R is initially positive, increases to a maximum and then decreases to negative values. This implies that web growing will occur only within that range of wave number where R is positive. Webs with very high wave number will diminish in length and only those with moderate to low wave number will grow. Under a third case of conditions, R will be positive during web formation. Under general behaviour, the growth rate will exhibit a maximum at some value and become negative at still higher values. Consequently, the result is the same as obtained for the second case discussed immediately above.

Following this analysis, it can be deduced as follows:

| Parameter | Webbing |
| --- | --- |
| Plastic viscosity increases | Increases |
| Pressurizing fluid viscosity decreases | Increases |
| Interface velocity increases | Increases |
| Interfacial tension decreases | Increases |
| Article thickness decreases | Increases |
| Density of plastic minus density of fluid increases | Increases |

For a positive growth rate R, it is found that increasing the flow length will increase the length of the webs. If, however, the growth rate is negative, increase in the flow length will decrease the length of the webs and could even lead to their disappearance.

Accordingly, long plastic flow path length is beneficial only if the other variables or parameters are already favorable to the formation of webs. In the presence of unfavorable conditions, long flow length is a deterrent to the maintenance of the webs.

Although it is theoretically indicated that low interfacial tension favors the formation of long webs, low interfacial tension can also cause relatively broad webs resulting in fewer webs per molded structural web article. Therefore, a compromise should be sought in order to maximize both of these effects.

The density effect (plastic and pressurizing fluid) is minimal. It can be shown that a density difference of the order of 10 gm/cc is necessary in order to get any amplification of web formation. In general, the density of plastic materials is of the order of 1 gm/cc and that of a pressurizing fluid such as nitrogen gas is of the order of $10^{-3}$ gm/cc. Accordingly, when web formation is obtained under such conditions, it is clear that it is produced not by the difference in densities but by a proper coordination of the other process variables: viscosities, elasticities, pressure and/or velocity or flow rate, interfacial tension, mold cavity thickness, mold cavity length and plastic volume. In the drawings:

Figure 1:
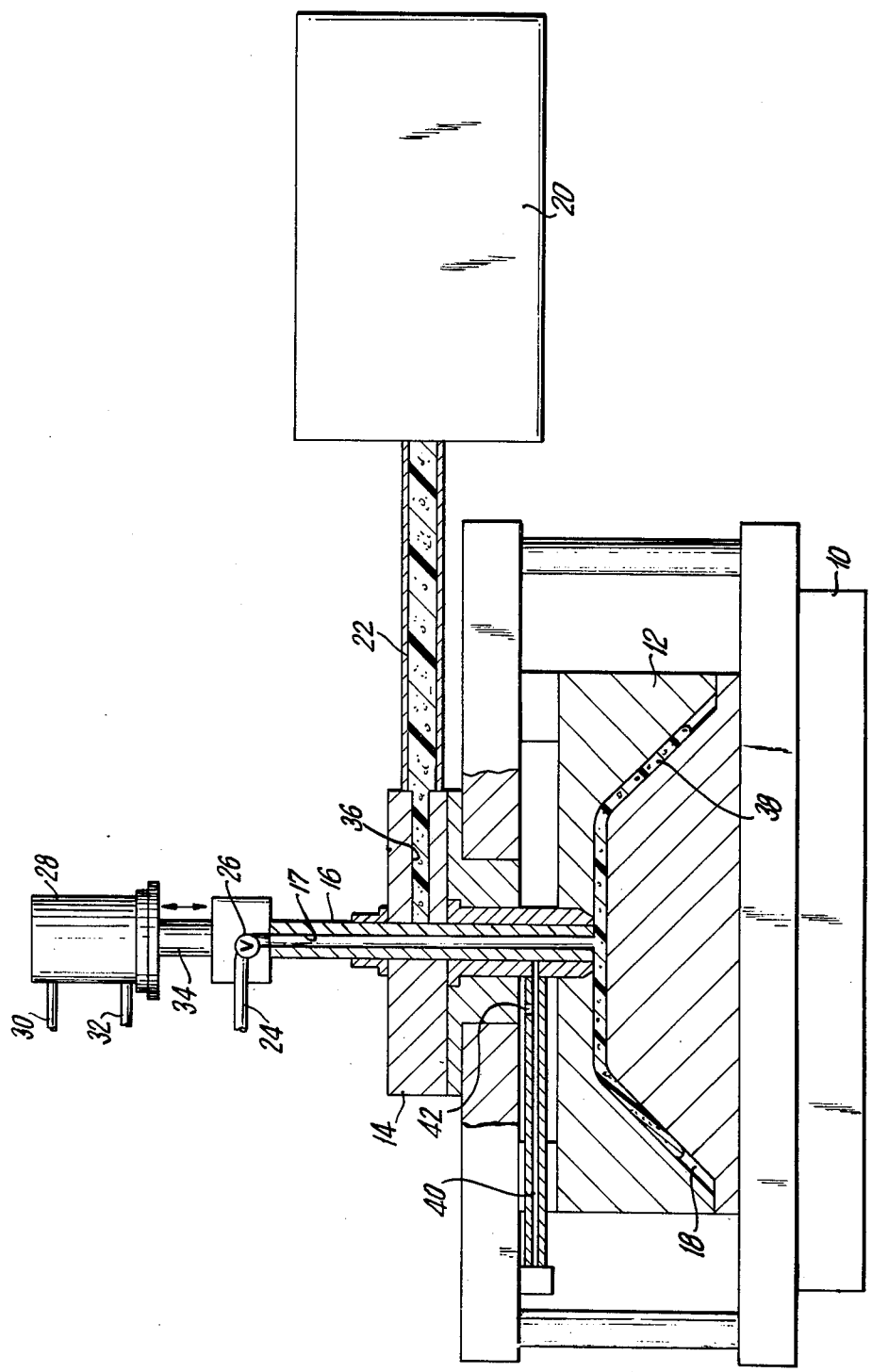
FIG. 1 is an elevational schematic view, partially in section, of apparatus capable of practicing the process of the present invention to produce the novel structural web articles.

Referring specifically to the drawings, apparatus suitable for practicing the process of the invention is shown schematically in the embodiment of FIG. 1 wherein press 10 supports mold 12 and plastic material is introduced through manifold 14 to the mold cavity 18 and pressurizing fluid is introduced through hollow nozzle rod 16 into plastic material. The plastic material is fed from a feeding device 20 which may comprise a high shear melting extruder, an extruder-accumulator combination (as employed in the structural foam process), a ram-type injection cylinder-accumulator combination or conventional injection molding equipment which comprises a heating extruder and an injection molding chamber wherein melting and accumulation of the plastic is effected.

The plastic material is fed from feeding device 20 through conduit 22 to manifold 14. Pressurizing fluid is fed through inlet conduit 24 to the interior 17 of hollow nozzle rod 16 and controlled by suitable valving means 26.

Pneumatic actuator means 28 having fluid inlet and outlet ports 30 and 32 is mechanically connected through shaft 34 to the hollow nozzle rod assembly 10 which is moveably positioned so as to be raised and lowered within manifold member 14.

As shown in FIG. 1, plastic conduit 22 and manifold passage 36 are filled with plastic material. Mold cavity 18 is partially filled with plastic material 38. Hollow nozzle rod 16 has been lowered by actuation of pneumatic actuator 28 to interrupt the flow of plastic through manifold passage 36 and to position the lower end of the hollow nozzle rod 16 close to or within the mold cavity where the pressurizing process may be commenced.

The pressurizing fluid is admitted by proper actuation of valve means 26 to introduce the fluid into the plastic material body 38 within the mold cavity 18. The plastic material assumes the contour of the walls of the mold cavity and produces the structural web article of the invention having an outer skin, a continuous hollow center and positioned therein at least one skin-connecting web.

The pressure is maintained on the pressurizing fluid until the structural web article is self-supporting. Thereupon valve means 26 is actuated and hollow nozzle rod 16 is retracted above rod valve means 40 by pneumatic actuator 28 and rod valve means 40 is retracted to open venting port 42 and permit the venting of the pressurizing fluid from the molded article within the mold.

Figure 2:
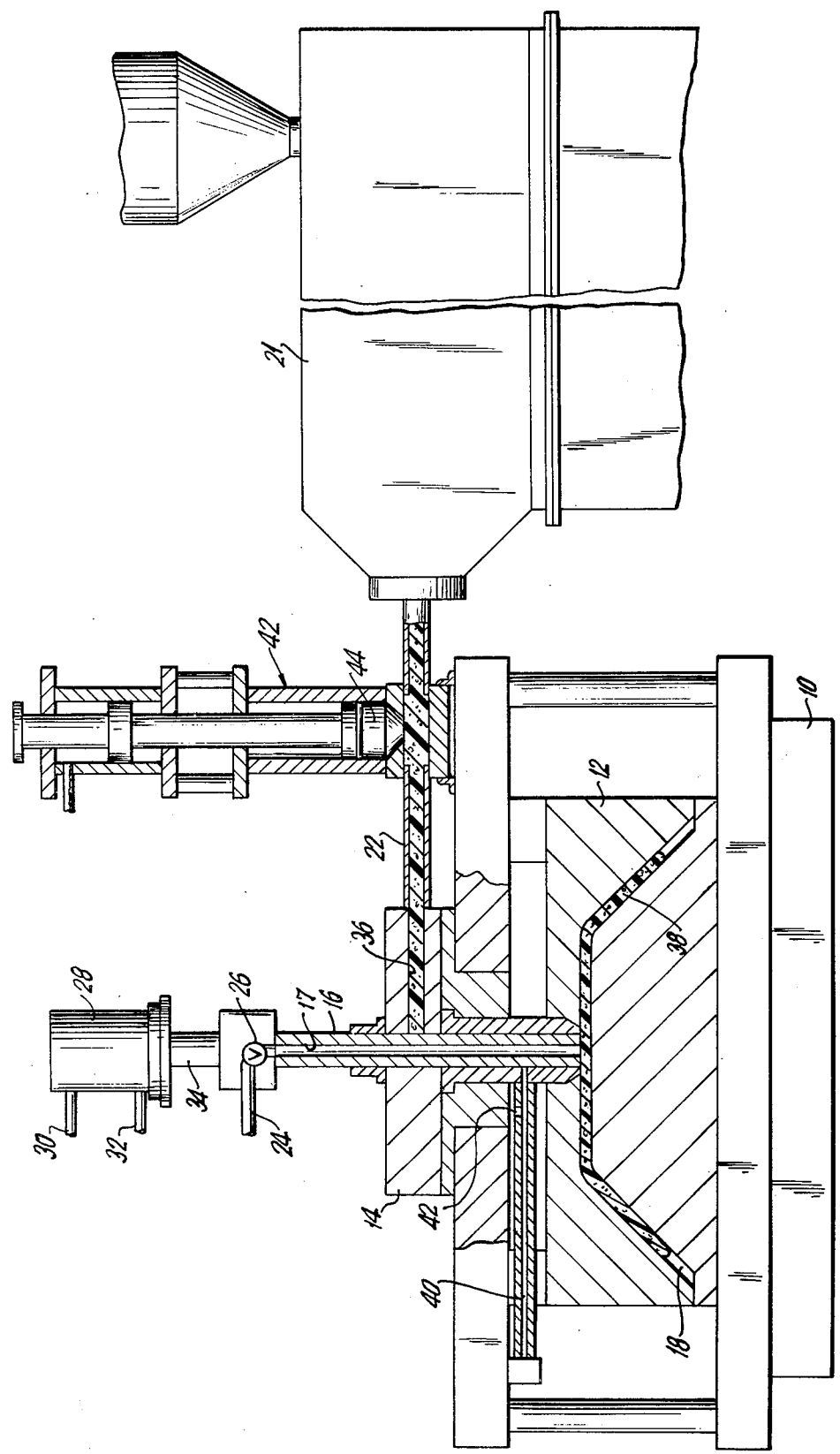
FIG. 2 is an elevational schematic view, partially in section, of apparatus of the type employed in the production of structural foam articles, here modified for employment in the practice of the process of the invention to produce novel structural web articles.

As shown in the embodiment of FIG. 2 an extruder accumulator, of the type employed in the injection molding of structural foam, was modified for employment as the plastic material feeding device 20. Solid plastic particles may be fed to the hopper of a conventional extruder 21 for the plasticating of plastic material. Plastic material is then fed through conduit 22 to an accumulator 42 having moving piston member 44 to provide a chamber for receiving the plastic material 38 therein before passage through manifold passage 36 toward the hollow nozzle rod assembly 16. All of the other elements of the apparatus of the embodiment of FIG. 2 are the same as those in the embodiment of FIG. 1. By the employment of an extruder-accumulator of the structural foam injection molding type, plastic material 38 is feedable to the manifolding system 14 from which it is delivered to the mold in the same manner as in the embodiment of the apparatus of FIG. 1.

Figure 3A:
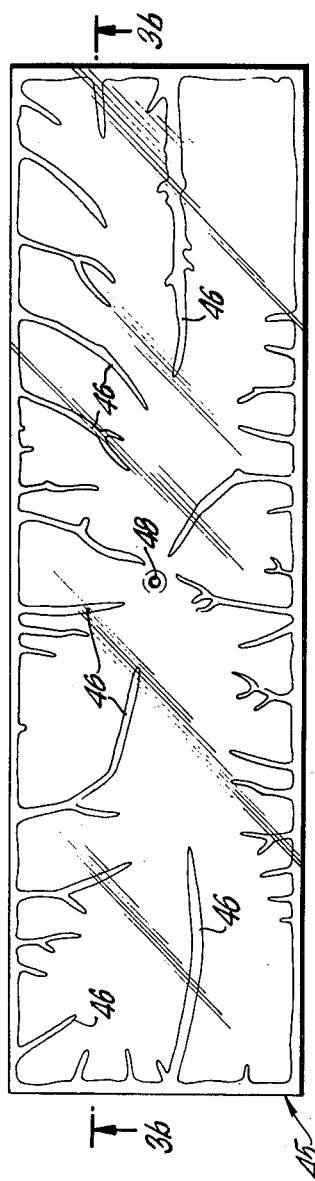
FIG. 3a is a top view of a molded structural web article of the invention.

Flat rectangular structural web articles have been produced employing the process of the invention in apparatus of the general type shown in FIG. 2 of the drawings. FIG. 3a sets forth in top view such a structural web article 45 produced of general purpose unmodified crystal polystyrene in a flat rectangular 30"×10"×⅜" mold. As there seen, a multiplicity of skin-connecting structural webs 46 are produced, generally disposed in direction toward the point of injection 48.

Figure 3B:
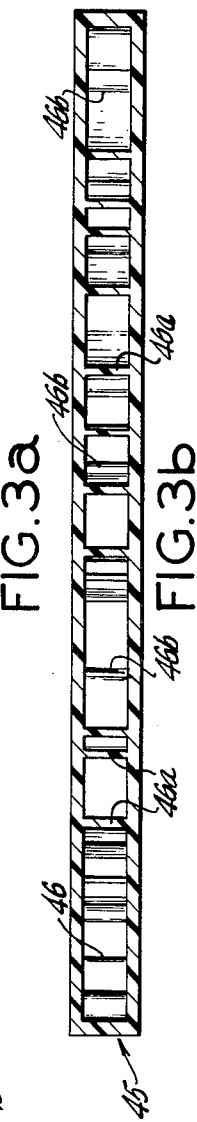
FIG. 3b is a sectional view of the article of FIG. 3a taken along the line 3b—3b thereof.

The cross sectional view of FIG. 3b shows the internal hollow construction of the structural web article of FIG. 3a with the shape of the associated structural webs 46 some of which are in cross-section as elements 46a, others of which are in elevation as 46b due to the line 3b—3b along which FIG. 3b was taken. The pressurizing fluid pressure employed in the production of the article of FIGS. 3a and 3b was 400 psi.

Figure 4A:
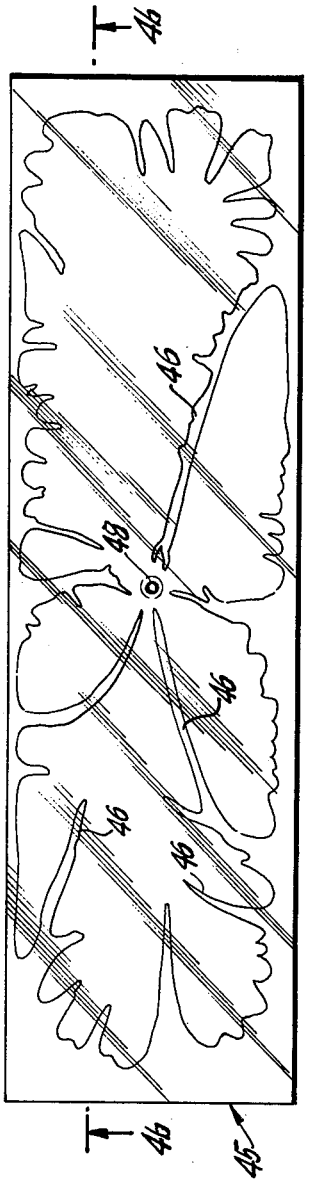
FIG. 4a is a top view of another molded structural web article of the invention.
Figure 4B:
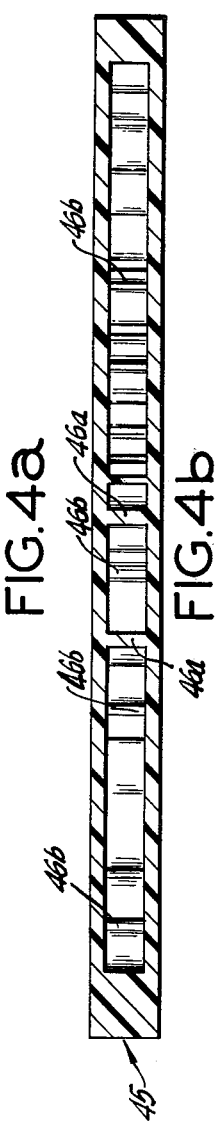
FIG. 4b is a sectional view of the article of FIG. 4a taken along the line 4b—4b thereof.

FIG. 4a shows the top view of another structural web article formed in the same manner as the structural web article of FIGS. 3a and 3b but with a lower pressurizing fluid pressure of 200 psi. As may be seen from the top and cross-sectional views of FIGS. 4a and 4b, the pressure of the pressurizing fluid was not sufficient to form the degree of webbing attained in the articles of FIGS. 3a and 3b. This resulted from a reduction in interface shear rate, velocity and flow rate due to the lower pressurizing fluid pressure employed in production of the article of FIGS. 4a and 4b.

It has been found that the disposition of webs presents a distinct variable in the structural web process. For example, it has been found that a multi-nozzle operation does not regularize the webs in their distribution, but that the webs generated are preferentially disposed toward the nozzle of origin of the pressurizing fluid.

As employed herein, the terms "regularized" and "substantially regularized" mean that at least one web is positioned in a predetermined location within the structural web article.

Figure 5:
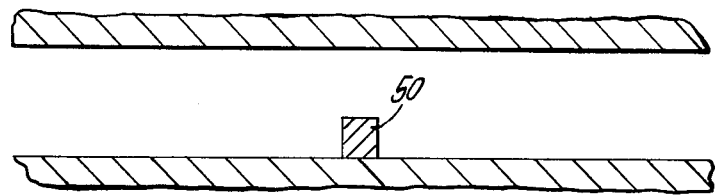
FIGS. 5 and 6 are schematic elevational sectional views of interior mold construction for practicing further aspects of the process of the invention.
Figure 6:
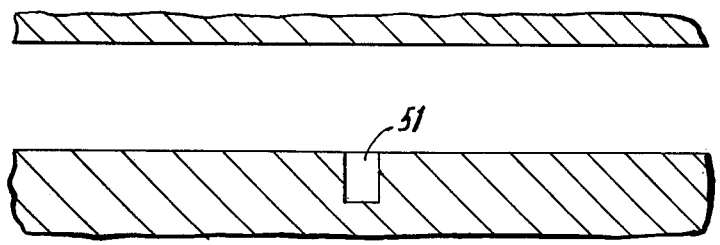

It has been found, however, that structural web articles can be regularized in the following two ways:

(1) By employing solid plastic inserts. It has been found, however, that this expedient produces an undesirable article product due to localized weakness around the insert;

(2) By employment of a mold cavity having multiple wall thicknesses. The employment of a mold having a wall configuration as shown in FIG. 5 of the drawings permits the pressurizing fluid to preferentially flow through the plastic material residing in the thicker channel, rather than through the thinner channel. The employment of a mold with an indentation 51, as shown in FIG. 6 of the drawings, permits fluid plastic flow such that the thickness of the polymer around an indentation is modified and the part thickness and mechanical characteristics around the rib are enhanced.

Figure 7:
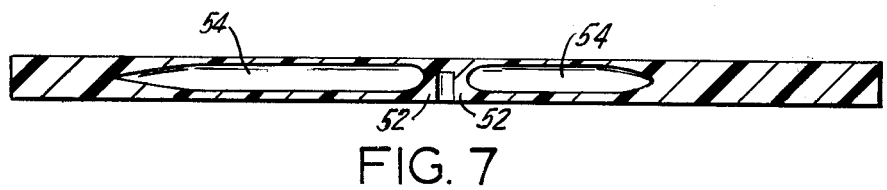
FIG. 7 is a transverse cross-sectional view of a molded article taken near one end of the article.

In the case of the second regularization experiment as shown in FIG. 5, the cross-sectional view of FIG. 7 illustrates that obtained for a 36"×15"×½" part wherein the mold was divided into sections employing ⅜"×⅜" key stocks 50 of varying length. The ribs 52 are formed around the key stocks and the hollow interior pockets 54 are maintained only in the thick sections. It was found that the pressurizing fluid never crossed over the key stock and was effectively blocked by the polymer.

It is one additional variation of the process aspect of the invention to post-fill a completed structural web article after its production. The hollow interior of the structural web article may be filled through the open point of injection 48 to produce a filled article having internal structural webs and outer skin. Similarly, the structural web articles may be filled with foamed plastic material by the injection of a foamable plastic mixture through the open point of injection 48 or other point into the hollow interior of the structural web article. In the case of filling of the interior of the structural web article with foamed plastic, it will be preferable to provide a suitable number of venting ports through the outer skin or side walls of the article to relieve the pressure and permit the venting of the foaming agent.

It is, of course, to be understood that the solid or foam-filled hollow interiors of structural web articles may be produced with the same or differing plastic materials as were employed to form the structural web articles. But the structural web articles produced in accordance with the invention are preferably substantially free of foamed portions either in the outer skin or in the plurality of skin-connecting webs contained therein.

Twelve molds were employed with apparatus of the type shown in FIG. 2 of the drawings to produce a number of structural web articles in order to illustrate the significance of the mold dimensions on web formation. The mold cavity dimensions were 6"×6"×t, 10"×t and 28"×8"×t, where t=⅛", ¼", ½" and 1". Some 28"×8"×2" parts were also made by placing two 1-inch frames (mold halves) on each other. The Tables below set forth the pertinent summary data.

Structural webs were formed of high density polyethylene at relatively low pressure in all samples up to one-inch thick. For two-inch thick samples or thick smaller square samples, higher pressures are generally required to induce webbing.

TABLE I

| | | | 6" × 6" × t" | | |
|---|---|---|---|---|---|
| L (in) | t (in) | L/t | P (psi) | Webbing | No. of Webs |
| 6 | ⅛ | 48 | 800 | Yes | Numerous |
| 6 | ¼ | 24 | 800 | Yes | Numerous |
| 6 | ½ | 12 | 200 | No | 0 |
| 6 | ½ | 12 | 800 | Yes | 1 |
| 6 | ½ | 12 | 1200 | Yes | 3 |
| 6 | 1 | 6 | (400–1600) | Yes | 1 |

TABLE II

| | | | 10" × 10" × t" | | |
|---|---|---|---|---|---|
| L (in) | t (in) | L/t | P (psi) | Webbing | No. of Webs |
| 10 | ⅛ | 80 | 600 | Yes | Numerous |
| 10 | ¼ | 40 | 400–1000 | Yes | Numerous |
| 10 | ½ | 20 | 100–1000 | Yes | Numerous |
| 10 | 1 | 10 | 100 | No | 0 |
| 10 | 1 | 10 | 200 | Yes | 2 |
| 10 | 1 | 10 | 300 | Yes | 2 |
| 10 | 1 | 10 | 400 | Yes | 2 |
| 10 | 1 | 10 | 800 | Yes | 4 |
| 10 | 1 | 10 | 1200 | Yes | 5 |

TABLE III

| | | | 8" × 28" × t | | |
|---|---|---|---|---|---|
| L (in) | t(in) | L/t | P (psi) | Webbing | No. of Webs |
| 28 | ⅛ | 224 | 200–400 | Yes | Numerous |
| 28 | ¼ | 112 | 400 | Yes | Numerous |
| 28 | ½ | 56 | 400 | Yes | 8 ≦ N ≦ 12 |
| 28 | 1 | 28 | 400–600 | Yes | 3 ≦ N ≦ 6 |
| 28 | 2 | 14 | 600 | Yes | 1 |

Structural web parts have also been molded with styrene-acrylonitrile copolymer (C-11), polypropylene, polycarbonate, polysulfone, high impact, medium impact and crystal polystyrene, ethylene-vinyl acetate copolymer, and $CaCO_3$-filled high density polyethylene. Two-inch thick pieces made indicated that structural web articles can be used in fabricating doors, furniture and in other markets where much higher thickness is in demand.

The following examples set forth varying aspects of the present invention.

EXAMPLE 1

High density polyethylene pellets having a solid density of 0.962 g/cm³ at 77° F. and a melt index of 8.0 g/10 min were fed into the hopper of a two-stage extruder. The extruder contained a 2½" diameter screw with L:D=24:1, a metering depth of 0.110" in the first stage and 0.135" in the second stage and a compression ratio of 4/1 in the first stage and 3.26/1 in the second stage. The resin was plasticated by the extruder screw running at 18.0 revolutions/min. and conveyed to an accumulator of the type shown in FIG. 2 having a total volume of 460 cubic inches.

From the partially filled accumulator, the resin was shot at a temperature of 440° F., into a ⅜"×10"×36" mold cavity with a volume of 135 cubic inches. The plastic volume was 100.7 cubic inches based on the solid density of high density polyethylene at 77° F. The mold was maintained at 77° F.

Nitrogen gas was injected into the mold at a pressure of 400 psi. The mold was expanded by the internal pressure as the plastic cooled, the gas pressure was released and the final product had a dimension of 21/32"×10"×36" which corresponds to a part density of 42.6% of the solid resin. The product had a solid integral shell with a plurality of reinforcing skin-connecting webs and continuous hollow center.

EXAMPLE 2

General purpose unmodified crystal polystyrene pellets having a solid density of 1.05 g/cc at 77° F. and an extrusion plastometer flow rate of 7.5 g/10 min were fed into the hopper of the two-stage extruder of Example 1. The resin was plasticated by the extruder screw running at 33 revolutions/min. and conveyed to an accumulator having a total volume of 460 cubic inches.

From a partially-filled accumulator, the resin was shot at a temperature of 495° F. into a ⅜"×10"×30" mold cavity (one of its walls being textured) having a volume of 112.5 cubic inches. The plastic volume was 100.7 cubic inches based on the solid density of crystal polystyrene at 77° F. The mold was maintained at 70° F.

Gas was injected into the mold at a pressure of 400 psi. The mold was expanded as the plastic cooled, the gas pressure was released and the final product had a dimension of 17/32"×30" which corresponds to a part density of 63% of the solid resin. The product was transparent, it has a solid integral replicated textured surface shell with a plurality of reinforcing skin-connecting webs with a generally continuous hollow center.

EXAMPLE 3

Bisphenol A polycarbonate pellets having a solid density of 1.57 g/cc at 77° F. were fed into the hopper of the two-stage extruder of Example 1. The resin was plasticated by the extruder screw running at 33 revolutions/min and conveyed to an accumulator having a total volume of 460 cubic inches.

From the partially filled accumulator, the resin was shot at a temperature of 570° F. into a ⅜"×10"×+" mold cavity (one of its walls being textured) having a volume of 112.5 cubic inches. The plastic volume was 78.75 cubic inches based on the solid density of the polycarbonate at 77° F. The mold was maintained at 360° F.

Gas was injected into the mold at a pressure of 400 psi. The part was cooled to a temperature of 77° F., the gas pressure was released and the final product had a dimension of ⅜"×10"×30" which corresponds to a part density of 70% of the solid resin. The product was transparent, it had a solid integral replicated textured surface shell with a plurality of reinforcing skin-connecting webs with a generally continuous hollow center.

EXAMPLE 4

High impact, general purpose polystyrene pellets having a density of 1.04 g/cc at 77° F. and an extrusion plastometer flow rate 4.5 g/10 min of were mixed with 1% magenta dye and fed into the hopper of the two-stage extruder of Example 1. The resin was plasticated by the extruder screw running at 33 revolutions/min and conveyed to an accumulator having a total volume of 460 cubic inches.

From a partially filled accumulator, the resin was shot at a temperature of 540° F. into a battery tray mold cavity 16½"×16½" square bottom. The bottom was perpendicular to, but continuous with its four sides each of which was 3¼" high. The bottom cavity was ⅜" thick, whereas all the four sides were ¼" thick. There was a ⅜"×1" thick rim cavity all around the top edge of the sides. The total volume of the cavity was approximately 171.60 cubic inches. The plastic volume was 142.4 cubic inches based on the solid density of high impact polystyrene at 77° F. The mold was maintained at 70° F.

Gas was injected into the mold at a pressure of 300 psi. The part was cooled to a temperature of 70° F., the gas pressure was released and the final product was a magenta coloured battery tray of identical geometrical dimension as the mold cavity. The product corresponded to a part density of 83% of the solid resin; a dissected sample revealed a solid integral shell with a plurality of reinforcing skin-connecting webs and a generally continuous hollow center.

EXAMPLE 5

High density polyethylene pellets having a solid density of 0.962 g/cm$^3$ and 77° F. and a melt index of 0.8 g/min were mixed with 1% magenta dye and fed into the hopper of the two-stage extruder of Example 1. The resin was plasticated by the extruder screw running at 30 revolutions/min. At the beginning of the second stage, nitrogen gas was injected into the plastic at a differential pressure of 400 psi; the second stage homogenized the gas/polymer mixture which was conveyed to an accumulator having a total volume of 460 cubic inches. The extruder and the accumulator were maintained at a pressure higher than the foaming pressure.

From a partially filled accumulator, 1.5 lbs. of the foamable mixture was shot at a temperature of 490° F. into the generally continuous hollow center of the structural web product of Example 2, through the open port of injection 48. To permit the venting of the foaming high density polyethylene, a suitable number of venting ports were first drilled through the outer edges.

The part was cooled and then examined. The magenta colored foam substantially filled the continuous hollow space interspersed between the plurality of webs.

EXAMPLE 6

High impact, general purpose polystyrene pellets having a density of 1.04 g/cc at 77° F. and an extrusion plastometer flow rate of 4.5 g/10 min were fed into the hopper of the two-stage extruder of Example 1. The resin was plasticated by the extruder screw running at 35 revolutions/min and conveyed to an accumulator having a total volume of 460 cubic inhes.

Figure 8:
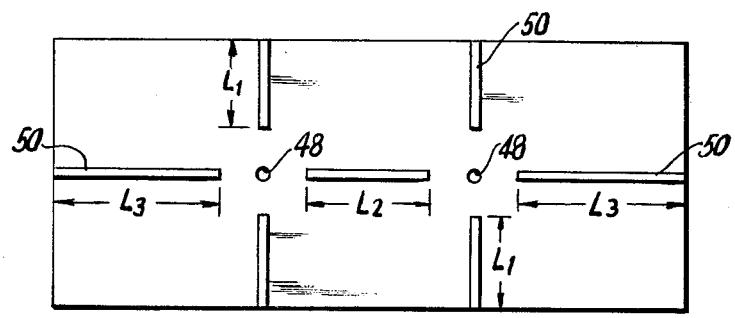
FIG. 8 is a top schematic view of a mold arrangement employed in the practice of the present invention, having two points of injection.

From a partially filled accumulator, the resin was shot through two injection points at a temperature of 400° F. into a 178"×15"×36" mold cavity divided into sections by using a set of regularly arranged ⅜"×⅜"×L" key stocks. There were four key stocks with $L_1=5$", one with $L_2=7$" and two with $L_3=9½$"; all arranged as shown in FIG. 8 of the drawings. The total mold cavity volume was approximately 263.5 cubic inches. The plastic volume was 235.5 cubic inches based on the solid density of high impact polystyrene at 77° F. The mold was maintained at 70° F.

Gas was injected into the mold at a pressure of 200 psi. The mold was expanded slightly as the plastic cooled, the gas pressure was released and the final product had a dimension of 9/16"×15"×36" with the volume of the inserted key stocks unchanged. This corresponds to a part density of 78% of the solid resin. A dissected sample revealed a solid integral shell with a plurality of reinforcing skin-connecting webs and a generally continuous hollow center. In each instance, webs (similar to FIG. 7) were formed around the predetermined location of the key stocks.

The process of the present invention has been employed to successfully produce a wide variety of structural web articles of manufacture. Objects of complicated geometry such as trip kits and battery trays were so molded. Structural web articles may also find application as doors, furniture, canopies and roofing, modular construction units, food chests and coolers, trays for edibles, automotive and aircraft interior parts, telephone housings, musical instrument cases and the like.

Since both structural web articles of the invention and structural foam articles of the prior art are low-density products, the flexural properties of both are compared with that of solid material of the same plastic material, i.e., high density polyethylene, in the following Table.

TABLE IV

| Density(D)/Process* | Yield Strength psi | ASTM-D-790 Flexural Modulus at 1% Secant psi |
|---|---|---|
| 0.45/SW | 1068 | 74,900 |
| 0.45/SF | 1030 | 65,700 |
| 0.68/SW | 1600 | 119,000 |
| 0.68/SF | 1640 | 106,000 |
| 1.0 Solid | 4000 | 150,000 |

*SW = Structural Web Process
SF = Structural Foam Process

It can, therefore, be seen that, at identical density of 0.45 for SF and SW, the yield strengths are approximately equal but the flexural modulus for SW is 14% higher. Similarly, at D=0.68, the yield strength values are again equal but the flexural modulus is 12% higher for SW. The importance of higher modulus values is better understood in terms of stiffness:

$$\text{Stiffness} = c(\text{Thickness})^3 \times \text{Modulus}$$

Hence, for applications requiring equivalent stiffness, SW would do a job at a density of 0.39 which SF would do at a density of 0.45; SW would do a job at a density of 0.6 which SF would so at a density of 0.68.

It is noted that normal structural foam products produced in a cold mold have a traditional swirl surface. A body of recently-developed technology provides for the production of structural foam articles having a smooth surface, but requiring the employment of a hog mold which results in approximately 50% increase in cycle time and up to approximately 25% increase in mold cost. The structural web articles produced in accordance with the present invention provide smooth surface parts in a cold mold at substantial savings in mold design, cycle time and energy.

It is, of course, to be understood that structural web articles produced in accordance with the process of the invention are transparent when produced from clear plastic. This factor is important in use applications requiring light transmission.

Structural web parts may be made from thermally unstable (e.g. polyvinyl chloride), cross-linkable and thermosettable resins as discussed hereinabove. Parts may also be made from reinforced thermoplastic material for added strength.

In the structural web process, due to the interior construction, about 50% of the molded thickness is cooled, whereas about 100% of the molded thickness has to be cooled in the structural foam process. In addition, the reduced thermal conductivity of a structural foam product of equal density further increases the cooling time requirement. Furthermore, on account of the ability of the structural web process to produce smooth surface products in a cold mold, inexpensive tooling and mold design can be utilized. The sum total of all such differences from the structural foam process is that the the structural web process provides products which are made at substantial savings in mold design, cycle time and energy. (The cycle time is defined as the total time required to produce a product).

What is claimed is:

1. A process for the product of a molded plastic structural web article comprising: introducing a volume less than the volume of the mold of a molten plastic material, having a high shear viscosity and elasticity, into a mold cavity having a contour which provides the desired flow length-to-thickness ratio; injecting low viscosity pressurizing fluid into said molten plastic material in said mold cavity through at least one injection opening and at a fluid flow rate and fluid pressure to cause (i) said pressurizing fluid to penetrate into said molten plastic material so that the fluid-plastic interface is first deformed into a wave-like corrugation of finite lengths and (ii) the formation of a generally continuously hollow center with sufficient fluid-plastic interface distortion(s) to produce at least one skin-connecting web therein for each distortion and capable of growth with time whereby the outer portion of said plastic material is forced to assume the contour of said mold cavity, thereby forming a molten structural web article without causing said low viscosity pressurizing fluid to break through the plastic material flow front and prevent the plastic material from substantially completely assuming the contour of said mold cavity; and maintaining said pressure of said pressurizing fluid in said article in said mold until said article is self-supporting.

2. The process in accordance with claim 1, in which said low viscosity pressurizing fluid is injected into said plastic material at more than one point.

3. The process in accordance with claim 1, wherein the skin-connecting web(s) of said article is regularized as to its position(s) by additionally employing a mold cavity having multiple wall thicknesses, said web(s) being positioned at the location(s) of larger mold wall thicknesses.

4. The process in accordance with claim 1, wherein said at least one skin-connecting web has a length which grows with time in accordance with the following equation:

Web length $= ce^{(R \cdot t)}$; where c is a constant, t is time and R, the growth rate, is defined in turn by the following equation:

$$R = \left[ \frac{\mu_p - \mu_f}{\mu_p + \mu_f} \cdot v + \frac{d_p - d_f}{12(\mu_p + \mu_f)} \cdot g \cdot b^2 \right] v - \frac{\gamma b^2}{12(\mu_p + \mu_f)} \cdot v^3 \pm \dot{\Gamma} f \left( \frac{\tau v}{b}, \frac{\tau v}{L}, \frac{\tau p}{\mu \lambda v}, \frac{\tau \Delta v}{h} \right) ;$$

wherein:
R = growth rate of a given web
$\mu_p$ = plastic material viscosity
$\mu f$ = fluid viscosity
v = fluid-plastic interface velocity
$d_p$ = plastic material density
$d_f$ = fluid density
b = characteristic part thickness
g = acceleration due to gravity
$v$ = wave-number = $2\pi/l$
l = characteristic wave length p1 L = characteristic part length
p = fluid pressure
$\lambda$ = distance between two plastic webs
$\Delta$ = velocity difference between two different points on the same side of a plastic web
h = distance between the same two different points
$\dot{\Gamma}$ = characteristic interface shear rate $\sim$ v/b
$\gamma$ = interfacial tension
$\tau$ = relaxation time of the plastic material.

* * * * *

UNITED STATES PATENT AND TRADEMARK OFFICE
CERTIFICATE OF CORRECTION

PATENT NO. : 4,247,515

DATED : January 27, 1981

INVENTOR(S) : Olagoke Olabisi

It is certified that error appears in the above—identified patent and that said Letters Patent is hereby corrected as shown below:

In the specification and claims:

Col. 3, line 40 - after "pressure", "and" should read --the--.

Col. 5, line 31 - "predicated" should read --predicted--.

Col. 6, line 29 - "In the drawings:" should be a separate paragraph.

Col. 9, line 16 - "10"xt" should read --10"x10"xt--.

Col. 10, line 46 - "17/32"x30"" should read --17/32"x10"x30"--.

Col. 10, line 61 - "3/8"x10"x+" should read --3/8"x10"x30"--.

Col. 11, line 18 - after "partially", insert --filled--.

Col. 12, line 6 - "178"" should read --1/2"--.

Col. 13, line 3 - "hog" should read --hot--.

Col. 13, line 35 - "product" should read --production--.

UNITED STATES PATENT AND TRADEMARK OFFICE
CERTIFICATE OF CORRECTION

PATENT NO. : 4,247,515

DATED : January 27, 1981

INVENTOR(S) : Olagoke Olabisi

It is certified that error appears in the above—identified patent and that said Letters Patent is hereby corrected as shown below:

In the specification and claims:

Col. 14, line 21 - "(R.t)" should read --(R·t)--.

Col. 14, line 44 - Delete "pl". "L = characteristic part length" should be on a separate line.

Col. 14, line 48 - "V" should read --Vv--.

Signed and Sealed this

Fifth Day of May 1981

[SEAL]

Attest:

RENE D. TEGTMEYER

Attesting Officer    Acting Commissioner of Patents and Trademarks